(12) United States Patent
Tiedemann

(10) Patent No.: US 10,775,818 B2
(45) Date of Patent: Sep. 15, 2020

(54) VOLTAGE REGULATOR CIRCUITRY FOR REGULATING AN OUTPUT VOLTAGE TO A LOAD TO AVOID IRREVERSIBLE PRODUCT DAMAGE

(71) Applicant: SOCIONEXT INC., Yokohama-shi, Kanagawa (JP)

(72) Inventor: Dierk Tiedemann, Braunschweig (DE)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 16/243,983

(22) Filed: Jan. 9, 2019

(65) Prior Publication Data

US 2019/0227585 A1 Jul. 25, 2019

(30) Foreign Application Priority Data

Jan. 19, 2018 (EP) .................................... 18152591

(51) Int. Cl.
*G05F 1/56* (2006.01)
*G05F 1/569* (2006.01)
*H02H 9/04* (2006.01)
*G05F 1/46* (2006.01)

(52) U.S. Cl.
CPC ............... *G05F 1/56* (2013.01); *G05F 1/569* (2013.01); *H02H 9/04* (2013.01); *G05F 1/468* (2013.01)

(58) Field of Classification Search
CPC . G05F 1/10; G05F 1/573; G05F 1/563; G05F 1/565; G05F 1/569; G05F 1/571; G05F 1/56; G05F 1/575; G05F 1/46; G05F 1/462; G05F 1/468; H02H 9/02; H02H 9/04

See application file for complete search history.

(56) References Cited

U.S. PATENT DOCUMENTS 6,940,336 B2 9/2005 Bakker
2007/0030054 A1 2/2007 Lee et al.
2008/0094045 A1 4/2008 Lin
(Continued)

OTHER PUBLICATIONS

Extended European Search Report of related European Patent Application No. 18152591.6, dated Jul. 3, 2018.

*Primary Examiner* — Gustavo A Rosario-Benitez
(74) *Attorney, Agent, or Firm* — Arent Fox, LLP

(57) ABSTRACT

Voltage regulator circuitry, comprising: a pull-up path connected between a high-voltage supply and an output node for supplying a pull-up current from the high-voltage supply to the output node; a pull-down path connected between the output node and a low-voltage supply for drawing a pull-down current from the output node to the low-voltage supply; and a controller comprising pull-up control circuitry operable to control the pull-up current and pull-down control circuitry operable to control the pull-down current, so as to regulate an output voltage signal provided at the output node at a target voltage level even when an output current drawn from the output node along an output current path by a load varies over a range of positive and negative values, wherein the pull-down control circuitry is operable to: obtain measures of the pull-up current; and control the pull-down current based on the measures using at least one of proportional, integral and derivative control.

19 Claims, 4 Drawing Sheets

(56) References Cited

U.S. PATENT DOCUMENTS

| | | | |
|---|---|---|---|
| 2010/0164567 A1* | 7/2010 | Kim | G05F 1/56 |
| | | | 327/153 |
| 2011/0181257 A1 | 7/2011 | Pancholi et al. | |
| 2012/0049772 A1* | 3/2012 | Moussaoui | H02M 3/1588 |
| | | | 318/376 |
| 2013/0169247 A1* | 7/2013 | Onouchi | G06F 1/26 |
| | | | 323/269 |
| 2014/0015345 A1* | 1/2014 | Ivey | H02H 9/02 |
| | | | 307/326 |
| 2014/0266397 A1* | 9/2014 | Yuan | H03K 4/02 |
| | | | 327/401 |
| 2014/0269136 A1* | 9/2014 | Kamiya | G11C 5/14 |
| | | | 365/226 |
| 2015/0171829 A1* | 6/2015 | Song | H03K 17/687 |
| | | | 327/387 |
| 2015/0280709 A1* | 10/2015 | Cho | H03K 19/0005 |
| | | | 326/30 |
| 2015/0346750 A1 | 12/2015 | Bhattad | |
| 2015/0372679 A1* | 12/2015 | Kee | G05F 1/462 |
| | | | 327/543 |
| 2017/0011699 A1* | 1/2017 | Wang | G11C 19/28 |
| 2017/0038783 A1 | 2/2017 | Chen et al. | |
| 2018/0224875 A1* | 8/2018 | Ham | G05F 1/59 |
| 2018/0294785 A1* | 10/2018 | Tseng | H03F 3/45654 |

* cited by examiner

VOLTAGE REGULATOR CIRCUITRY FOR REGULATING AN OUTPUT VOLTAGE TO A LOAD TO AVOID IRREVERSIBLE PRODUCT DAMAGE

CROSS-REFERENCE TO RELATED APPLICATION

This application claims priority from European Patent Application No. 181525 filed Jan. 19, 2018. The entire contents of the prior application are incorporated herein by reference.

The present invention relates to voltage regulator circuitry and methods. Such circuitry may be or form part of an integrated circuit.

Voltage regulator circuitry (also referred to as a voltage regulator and/or a regulator) is generally used to regulate an output voltage to a load on the basis of, for example, a reference voltage, i.e. regulate the output voltage to be equal to or related to the reference voltage. Such circuitry may comprise a pull-up path, disposed between a high-voltage line and an output voltage line, and a pull-down path, disposed between the output voltage line and a low-voltage line (or ground). The pull-up path increases (pulls up) the output voltage by connecting the output voltage line to the high-voltage line. The pull-down path decreases (pulls down) the output voltage by connecting the output voltage line to the low-voltage line.

Regulators are commonly classified into different types, such as linear power supply (LPS) and low drop output power supply (LDO), and normally operate in the positive output range. That is, with a positive output voltage and a positive output current. However, due to variances in the load, the output current may become negative. Regulators may typically only be able to handle a small amount of negative current which results in a limited operating output current range. Furthermore, there is a risk of the output voltage of the regulator rising above voltage breakdown limits which may result in irreversible product damage.

It is therefore desirable to extend the operating output current range of voltage regulators and to avoid product damage due to high output voltages.

According to an embodiment of an aspect of the invention, there is provided voltage regulator circuitry, comprising: a pull-up path connected between a high-voltage supply and an output node for supplying a pull-up current from the high-voltage supply to the output node; a pull-down path connected between the output node and a low-voltage supply for drawing a pull-down current from the output node to the low-voltage supply; and a controller comprising pull-up control circuitry operable to control the pull-up current and pull-down control circuitry operable to control the pull-down current, so as to regulate an output voltage signal provided at the output node at a target voltage level even when an output current drawn from the output node along an output current path by a load varies over a range of positive and negative values, wherein: the pull-down control circuitry is operable to obtain measures of the pull-up current and to control the pull-down current based on the measures so as to regulate the output voltage signal at the target voltage; and the pull-down control circuitry is operable to control the pull-down current based on the measures of the pull-up current using at least one of proportional, integral and derivative control.

Thus the current on the pull-up path and the current on the pull-down path may be controlled such that the voltage at the output of the regulator (the output voltage) may be maintained, kept or biased at (or within a predetermined range of) a particular level, even when the output current becomes negative. For example, if a load connected to the output node causes the output voltage to become negative, the current on the pull-down path may be controlled based on measures of the pull-up current and to account for the negative current such that the voltage at the output node may be maintained or regulated at a target level. The pull-down current may be controlled using any appropriate proportional, integral or derivate control method, or a combination of two or more methods. Embodiments of the present invention may therefore extend the operating range of the regulator to both positive and negative output current values.

The pull-up path and the pull-down path may alternatively be considered as a first path and a second path, respectively. The target voltage level of the circuitry may be predetermined and may be determined by the application, properties and/or classification of the regulator.

Since the pull-down current is controlled based on the measures of the pull-up current using at least one of proportional, integral and derivative control, it may be seen that the pull-down control circuitry may comprise a PID controller or any other appropriate control circuitry that is capable of one or more of proportional, integral and derivative control. The pull-down control circuitry may also comprise a digital controller capable of digitally controlling the pull-down current. The type of control implemented by the pull-down control circuitry may be determined by the required change in pull-down current. For example, slow current changes may be controlled using proportional control and fast current changes may be controlled using differential control.

It may be preferable for the pull-up control circuitry to be operable to control the pull-up current based on the output voltage signal; and for the pull-down control circuitry to be operable to control the pull-down current based on the pull-up current. That is, the current on the pull-up path may be controlled with respect to the voltage at the output node, so that the current on the pull-up path is reflective of the output voltage. For example, if the output voltage is less than a certain level (i.e. the target level), the pull-up current may be increased so that the current supplied to the output node is increased and (provided that the load does not change) the output voltage increases.

Given the relationship and interdependency of the pull-up current, pull-down current and output voltage, it may also be considered that the pull-down current is controlled on the basis of the output voltage.

The pull-up control circuitry may comprise pull-up-path circuitry in the pull-up path, and may be operable to control the pull-up-path circuitry so as to control the pull-up current. That is, the pull-up-path circuitry may be disposed on the pull-up path and the pull-up current may be controlled by the pull-up control circuitry, by controlling the pull-up-path circuitry. The pull-up-path circuitry may preferably comprise a pull-up transistor connected along the pull-up path. The transistor may be disposed on the pull-up path such that, for example, the source of the transistor is connected to the high-voltage supply line and the drain of the transistor is connected to the output line. The pull-up-path circuitry comprising a transistor may be controlled by controlling the transistor so that the amount of pull-up current supplied to the output node from the high-voltage supply is regulated. The transistor may be any suitable type of transistor or a similar controllable switching component may alternatively be used in the pull-up-path circuitry. For example, the transistor may be a MOSFET or a bipolar junction transistor, in which case it will be appreciated that the source and drain discussed above, will instead be a emitter and collector, respectively.

It may further be preferable for the pull-up control circuitry to comprise a differential amplifier operable to compare a reference voltage and a voltage signal indicative of the output voltage signal. The differential amplifier may further control the pull-up-path circuitry to regulate the output voltage signal at the target voltage level based on the comparison. If the pull-up-path circuitry comprises a transistor, the output of the differential amplifier may be connected to the gate (or base) of the transistor such that the comparison result of the differential amplifier may be used to switch the transistor and thus control the pull-up current. The voltage signal indicative of the output voltage signal may be a feedback signal provided from the output node to an input of the differential amplifier such that the voltage at the output node is compared with another signal input to the differential amplifier. A reference voltage may be connected to another input node of the differential amplifier so that the comparison of the differential amplifier is between the reference voltage and the output voltage, and the pull-up-path circuitry is controlled on the basis of the difference between the two voltages. The reference voltage may be equal to the target voltage level. The amplifier may be any suitable type of amplifier such as a class-A amplifier. The pull-up control circuitry may alternatively comprise similar circuitry capable of comparing two inputs.

In a preferred embodiment the pull-down control circuitry comprises pull-down-path circuitry in the pull-down path, and the pull-down control circuitry may be operable to control the pull-down-path circuitry so as to control the pull-down current. In other words, the voltage regulator circuitry may comprise pull-down-path circuitry which is disposed on the pull-down path and forms part of the pull-down control circuitry. Furthermore, the pull-down current may be controlled by the pull-down control circuitry controlling the pull-down-path circuitry.

The pull-down-path circuitry may comprise a controllable current sink and/or a controllable resistance and/or a controllable current mirror and/or a controllable transistor (e.g. power-MOSFET) connected along the pull-down path. The pull-down-path circuitry may therefore be operable to introduce a current to the voltage regulator circuitry on the pull-down path using a varying and controllable current source. Alternatively or additionally, the pull-down-path circuitry may introduce a resistive element, with varying and controllable resistance, to the pull-down path of the circuitry.

The current on the pull-down path may therefore be controlled by controlling the pull-down-path circuitry. For example, if the pull-down-path circuitry comprises a controllable current sink, then the current on the pull-down path may be controlled by increasing or decreasing the current introduced to the circuit by the current sink. Conversely, if the pull-down-path circuitry comprises a controllable resistance, the pull-down current may be controlled by increasing or decreasing the resistance on the pull-down path, such that the current on the path is decreased or increased, accordingly.

The pull-down-path circuitry may comprise more than one current sink and/or more than one controllable resistance source. For example, the controllable current sink may comprise an array of current sinks, which are controlled by current-sink switching circuitry that switches those current sinks into or out of circuit. Similarly, the controllable resistance may comprise an array of resistors, controlled by resistor switching circuitry for switching those resistors into or out of circuit. As well as using unit resistors, the resistor array may include an array of resistors with the same or different values, and/or an array of variable resistors with the same or different ranges. An array including both current sinks and resistors may also be considered, with switching circuitry for switching the elements into or out of the circuitry so as to control the current on the pull-down path.

The pull-down control circuitry may preferably be operable to: monitor the operation of the pull-up control circuitry and determine whether the pull-down current can be reduced without the operation of the pull-up control circuitry departing from a given range of operation. Furthermore, the pull-down-path circuitry may reduce the pull-down current if it is determined that the pull-down current can be reduced without the operation of the pull-up control circuitry departing from a given range of operation. By monitoring the pull-up control circuitry, the pull-down control circuitry may determine whether the pull-down current can be reduced without negatively impacting the pull-up current or output voltage, i.e. causing the pull-up current to deviate from a given range or causing the output voltage to stray too far from the target voltage level. Accordingly, if it is possible for the pull-down current to be reduced without negatively affecting the pull-up current or the output voltage, the pull-down control circuitry may reduce the pull-down current (i.e. reduce the cross current) so that the power consumption of the circuitry is reduced and the power efficiency of the circuitry may be improved.

It may be desirable to reduce the cross currents in the circuitry—that is, the current flowing from the high-voltage supply to the low-voltage supply, through the regulator. Therefore, by reducing the pull-down current in accordance with the operation of the pull-up control circuitry, and thus in accordance with the pull-up current, the cross currents may be reduced so as to reduce the power consumption of the circuitry and improve the power efficiency. Similarly, the pull-up control circuitry may reduce the pull-up current in accordance with the pull-down control circuitry, provided the reduction does not have a negative impact on the output voltage. Alternatively or additionally, the controller may cause both the pull-up control circuitry and the pull-down control circuitry to reduce their respective path currents in combination so that the cross currents are reduce without causing the output voltage to deviate from a predetermined range associated with the target level. Accordingly, it may be preferable for the pull-down control circuitry to be operable to minimize the pull-down current to the extent possible without the operation of the pull-up control circuitry departing from a given range of operation.

Furthermore, the pull-down control circuitry may be operable to control the pull-down current so that it has a maximum value on start-up of the voltage regulator circuitry so as to reduce or limit a risk of the voltage level of the output voltage signal exceeding an upper-limit value. That is, the pull-down control circuitry sets the pull-down current to its maximum value on start-up so that the output voltage will be limited and damage of the circuitry may be avoided since voltage breakdown limits will not be reached. Once the regulator circuitry is switched on, the target operation of the circuitry may be determined and the pull-down current may be reduced accordingly so that the target operation, for example, the target output voltage, may be reached.

The pull-down control circuitry may also control the pull-down current to be maximum when the output current is at its lowest possible value (i.e. maximum negative value). Similarly, the pull-down control circuitry may also control the pull-down current to be minimum when the output current is at its maximum possible value (i.e. maximum positive value).

The pull-down control circuitry may be operable to obtain the measures of the pull-up current in each of a series of respective discrete measurement cycles, and to control the pull-down current in each measurement cycle. Furthermore, the measurement cycles may occur regularly, and/or may be synchronised with a clock signal. In a preferred embodiment, the pull-down control circuitry may be operable to control the pull-down current in each measurement cycle based on a plurality of said measures including a current measure and at least one previous measure. The plurality of measures may further comprise the measures of consecutive measurement cycles.

According to a preferred embodiment, the pull-down control circuitry may comprise a processor operable, based on a computer program, to control the pull-down current based on the measures of the pull-up current using the at least one of proportional, integral and derivative control.

It may be preferable for the pull-down control circuitry to be operable to control the pull-down current based on the measures of the pull-up current using said integral control, and to output a warning flag if the control indicates that the operation has entered a warning state for a given amount of time.

The pull-down control circuitry may be connected to obtain measures of the gate or base voltage of a pull-up transistor connected along the pull-up path as the measures of the pull-up current. Therefore, if the circuitry comprises a transistor disposed on the pull-up path, the measures upon which the pull-down current is controlled may be taken from the gate or base of the transistor, or it may be considered that the pull-down current is controlled based on the gate-source (or base-emitter) voltage of the transistor. The transistor on the pull-up path may be similar to (or the same as) the transistor of the pull-up-path circuitry discussed above, such that the gate from which the measures are taken may be connected to the output of a differential amplifier which compares a reference voltage with a feedback voltage from the output node.

The pull-down control circuitry may be operable to low-pass filter the measures of the pull-up current to obtain low-pass-filtered measures, and to control the pull-down current based on the low-pass-filtered measures. That is, the measures may be filtered with a low-pass filter of the pull-down control circuitry in order to remove high frequency components of the measures. The pull-down control circuitry may then control the pull-down current based on the measures which have been low-pass filtered.

The pull-down control circuitry may further comprise an analogue-to-digital converter operable to convert the measures of the pull-up current or the low-pass-filtered measures into digital-value measures, and to control the pull-down current based on the digital-value measures. It can therefore be seen that an analogue-to-digital converter may be provided as part of the pull-down control circuitry so as to convert the measures and/or the filtered measures into digital values, with the digital values being used to determine the control of the pull-down current. This may be beneficial, for example, if the pull-down control circuitry comprises a digital controller (such as a processor). In some embodiments it may be preferable for the pull-down control circuitry to comprise a digital controller such that the pull-down current is digitally controlled. This may be preferable depending on the pull-down-path circuitry and may provide more accurate and versatile control of the pull-down current.

In a preferred embodiment, the controller is operable to switch off, reduce power to or release control of at least part of the pull-down control circuitry (e.g. a processor) when the pull-up current is in a predetermined range. Therefore, if the pull-up current is in a predetermined range and the output voltage is also in a predetermined range, the pull-down control circuitry may at least partially switch off so as to reduce power consumption. When in a reduced power mode, the pull-down control circuitry may periodically check the pull-up current to determine whether it is still in a predetermined range, and may then switch on or return to full power mode if the pull-up current deviates from the predetermined range.

Alternatively, the controller may monitor the pull-up current and then switch on the pull-down control circuitry or return it to full power mode if the pull-up current is not within the predetermined range. If the voltage regulator is provided as part of a larger circuit, the pull-down control circuitry may be shared with one or more other aspects of the circuitry such that the other aspects of the circuitry require use of at least part of the pull-down control circuitry (e.g. a processor). In such a situation, the controller may indicate to the other aspects of the circuitry that at least part of the pull-down control circuitry is not in use by the voltage regulator when the at least part of the pull-down control circuitry is "switched off", has reduced power is released by the controller. Providing at least part of the pull-down control circuitry as a shared resource with other aspects of circuitry may be preferable to reduce circuit size and manufacturing costs of the circuitry.

The voltage regulator circuitry may comprise a failsafe hardware detection circuit configured to detect a critical falling output current and/or receive a critical load-change signal from the load and, if a critical falling output current is detected or the critical load-change signal is received, to control the pull-down current independently of said pull-down control circuitry to reduce or limit a risk of the voltage level of the output voltage signal exceeding an upper-limit value.

According to an embodiment of another aspect of the invention, there is provided an integrated circuit comprising the voltage regulator circuitry of the aforementioned first aspect of the present invention. The integrated circuit may, for example, be a system-on-chip (SOC) circuit. Additionally or alternatively, the voltage regulator circuitry may be a linear power regulator or a low-dropout (LDO) regulator.

The present invention extends to method aspects corresponding to the apparatus aspects.

Reference will now be made, by way of example only, to the accompanying drawings, of which:

Figure 1:
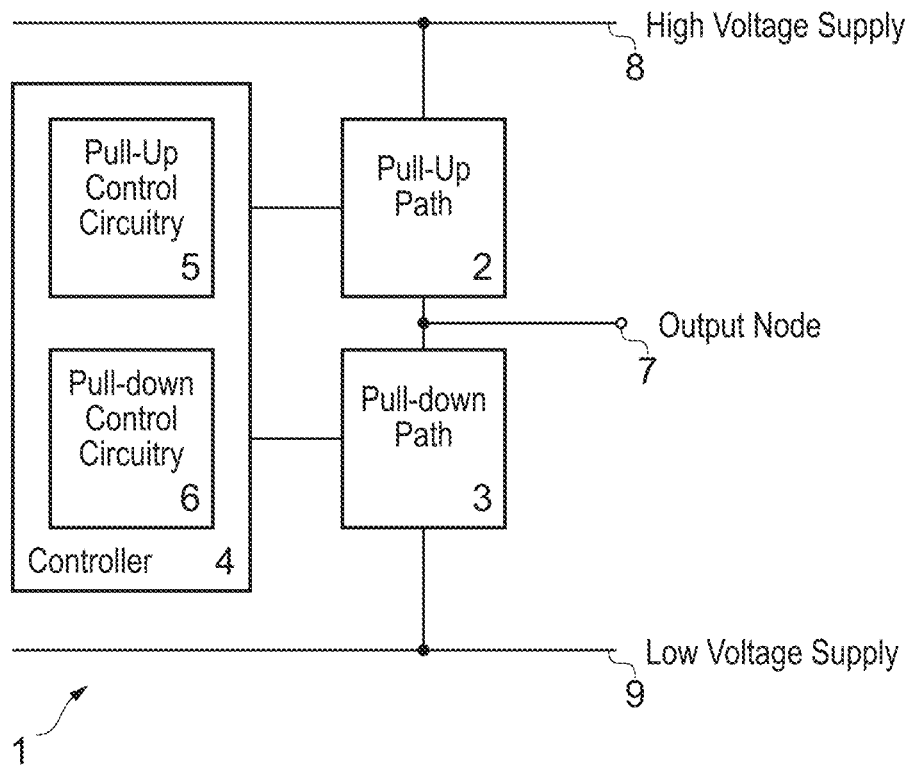
FIG. 1 is a block diagram of voltage regulator circuitry according to a general embodiment of an aspect of the invention.

FIG. 1 is a block diagram of voltage regulator circuitry according to a general embodiment of an aspect of the invention. The voltage regulator circuitry 1 comprises a pull-up path 2 and a pull-down path 3. The pull-up path 2 is disposed between a high-voltage supply 8 and an output node 7 and the pull-down path 3 is disposed between the output node 7 and a low-voltage supply 9. Connected to the paths is a controller 4 which comprises pull-up control circuitry 5 and pull-down control circuitry 6. The controller 4 is able to control both the pull-up control circuitry 5 and pull-down control circuitry 6 so that an output voltage signal at the output node 7 may be regulated within a predetermined range of a target voltage level. This is possible even if an output current drawn from the output node 7 along an output current path by a load becomes negative.

Figure 2:
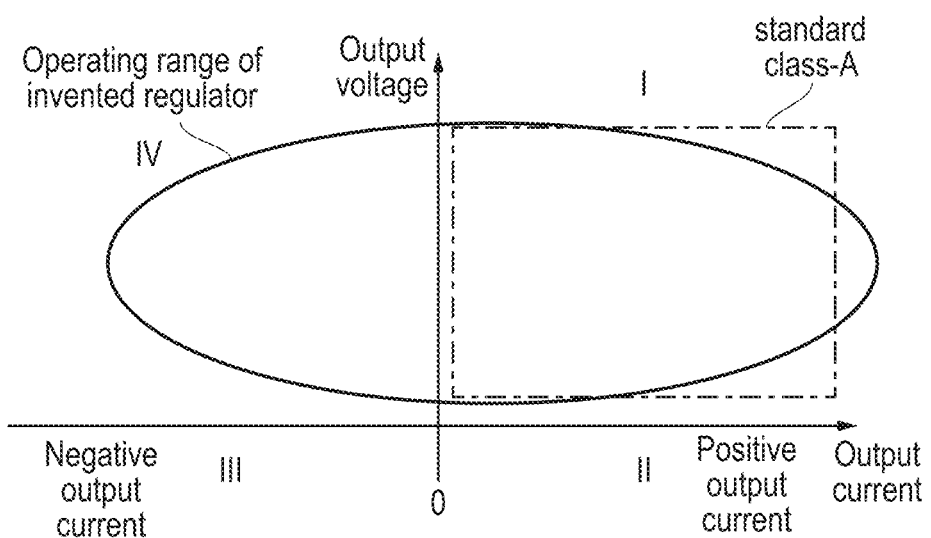
FIG. 2 is a diagram showing the operating range of voltage regulator circuitry according to embodiments of the present invention.

As discussed above, it is desirable to extend the operating output current range of a voltage regulator so that the circuit can operate when the output current is negative. The operating rage of the circuitry may be represented graphically, as depicted in FIG. 2. FIG. 2 shows a graph with output current represented on the x-axis and output voltage represented on the y-axis. FIG. 2 shows two quadrants of the graph which can be considered as the positive output current—positive output voltage quadrant (quadrant I in FIG. 2) and the negative output current—positive output voltage quadrant (quadrant IV in FIG. 2).

Considering a situation in which a class-A amplifier is used in an LDO regulator, it is known to implement a fixed pull-down path with a small current value in the regulator. This arrangement means that the regulator can only tolerate a limited amount of negative output current so the regulator is only able to operate in the positive output current-positive output voltage quadrant I shown in FIG. 2. There is also a risk in such an arrangement that a rising output voltage above component voltage breakdown limits will cause irreversible product damage.

According to embodiments of the present invention, the operating output current range of, for example, a class-A amplifier in an LPS or LDO regulator system, may be extended to two of the quadrants I, IV in FIG. 2. That is, voltage regulator circuitry according to embodiments of the present invention can operate in the positive output current—positive output voltage quadrant (quadrant I in FIG. 2) and the negative output current—positive output voltage quadrant (quadrant IV in FIG. 2). Furthermore, the risk of product damage due to rising output voltages may be reduced and cross currents across the regulator may also be reduced.

The voltage regulator has or may have a load connected at the output node, with the load connected in a potential divider arrangement and varying according to the application. That is, the load may be considered as one resistive load connected between the high-voltage supply and the output node, and another resistive supply connected between the output node and the low-voltage supply. Depending on the application of the regulator circuitry, the resistive loads may vary and it is also possible for one or both of the loads to be effectively removed. If this occurs then the voltage at the output node will vary and may rapidly increase. The parameters of the load, such as the minimum and maximum voltage and current values, may be known to the voltage regulator but the performance or application of the load might not be known.

Figure 3:
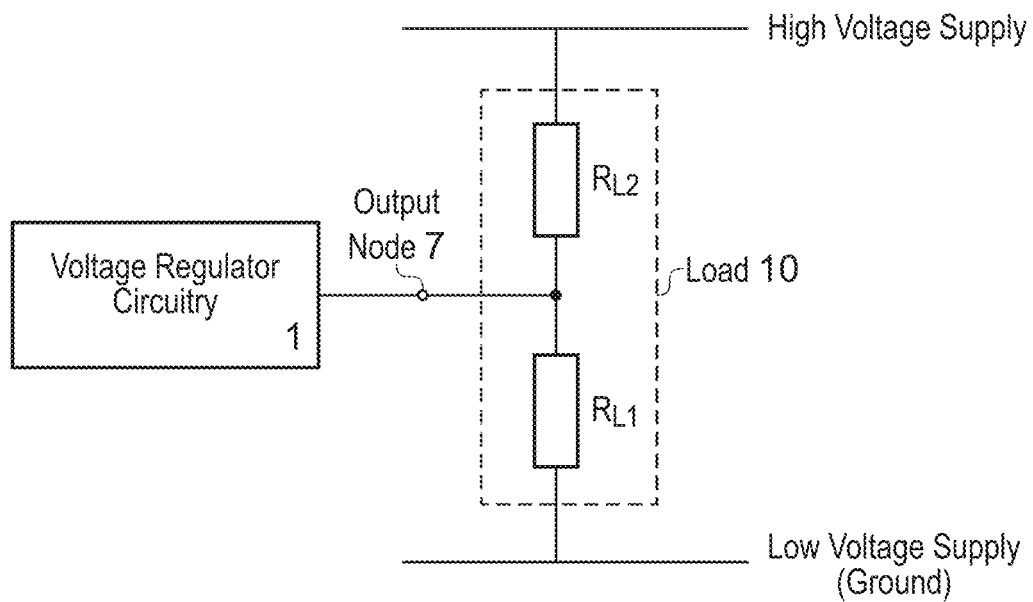
FIG. 3 is a circuit diagram showing the load that may typically be connected to the voltage regulator circuitry of a general embodiment of an aspect of the invention.

FIG. 3 shows a load connected to the output node in a potential divider arrangement. Two resistors RL1 and RL2 are connected to the voltage regulator circuitry 1 in FIG. 3. Resistor RL2 is connected between the output node 7 and a high-voltage supply and the resistor RL1 is connected between the output node and a low-voltage supply or ground.

For simplicity, the load is represented as two resistors RL1 and RL2 in FIG. 3 but may, in reality, be two further circuits connected to the output node, for example, if the regulator is provided as part of a sequence or array of circuits. As the operation of these circuits varies, then the effective load presented to the regulator circuitry will vary. Furthermore, if one or both of these circuits are 'switched off' then one or both of the resistors RL1 and RL2 presented to the regulator will be effectively removed.

For example, if the circuit represented by RL1 in FIG. 3 is switched off, then the value of RL1 will tend to infinite resistance (no current flowing through it) and so the output node of the voltage regulator circuitry 1 will effectively become the ground reference for the circuit represented by RL2. As a result the current at the output node will become negative as it flows from RL2 to the virtual ground (i.e. the current flows into the regulator circuitry). It can therefore be seen that the load connected to the output node can vary according to the application and the current at the output node can become negative e.g. if the value of RL1 increases. Accordingly, it is desirable for the regulator circuitry to be able to continue to operate when the output current is negative, for example, in a situation in which the load RL1 in FIG. 3 is effectively removed (infinite resistance). Embodiments of the present invention may compensate for the variances in the load by controlling the current on the pull-down path, so as to maintain the output voltage at a desired level.

Figure 4:
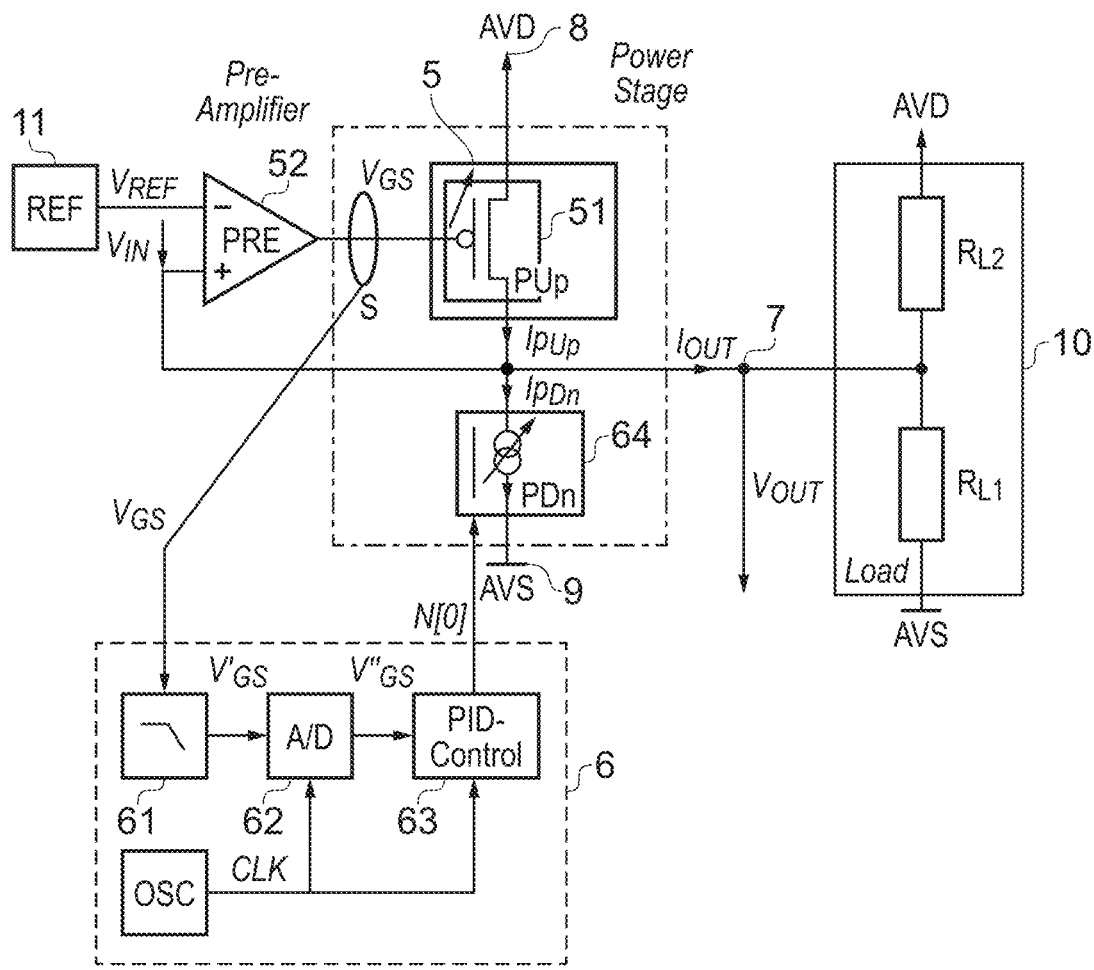
FIG. 4 is a circuit diagram of voltage regulator circuitry according to a detailed embodiment of an aspect of the invention.

FIG. 4 is a circuit diagram of voltage regulator circuitry according to a detailed embodiment of an aspect of the invention. In the voltage regulator shown in FIG. 4, the pull-up control circuitry 5 comprises pull-up-path circuitry including a transistor (PMOS MOSFET) 51 and an amplifier (differential amplifier, or operational amplifier) 52. The pull-down control circuitry 6 comprises pull-down-path circuitry 64, which in this example is a variable current source, a filter 61, an analogue-to-digital converter (ADC) 62 and a controller 63.

The transistor 51 of the pull-up-path circuitry is provided on the pull-up path and the pull-down-path circuitry 64 is provided on the pull-down path. The output node 7 is disposed between the pull-up path and the pull-down path. The load 10, comprising RL1 and RL2 is connected to the output node 7. A feedback path from the output node 7 is provided to an input of the amplifier 52 and a reference voltage VRef is provided from a reference source 11 to another input of the amplifier 52. The output of the amplifier is connected to the gate of the transistor 51, with the drain and source of the transistor connected along the pull-up path.

The gate-source voltage VGS is monitored by the pull-down control circuitry to obtain measures for controlling the pull-down current. The measures may be low-pass filtered by the filter 61, analogue-to-digital converted by the ADC 62 and used to control the pull-down-path circuitry 64 by a controller 63. In this example the pull-down-path circuitry 64 is depicted as a variable current source. However, as discussed above, the circuitry 64 may be any suitable controllable resistor, controllable current sink or combination of the both. It may be considered that the circuitry 64 introduces a dynamic resistance or dynamic current source to the pull-down path to compensate for changes in the output current. The suitable range of values for the pull-down current will depend on the application of the circuit and the output voltage and output current. Typically, the range of the pull-down current may be from 0 A to 5 mA.

The elements of the detailed example shown in FIG. 4 are discussed below.

The reference source REF 11 provides a reference voltage VRef to the circuit used in a comparison with the voltage of the feedback loop. Linear amplifier systems require a voltage reference target VRef which is used to regulate the output voltage node VOut. Commonly a temperature and corner compensated bandgap circuit is used for integrated circuits as the reference source REF 11.

The pre-amplifier is the first part of the overall amplifying system. It may comprise multiple amplifying sub stages within the pre-amplifier. This unit calculates the error VIn between the sensed feedback voltage VOut and the target reference voltage VRef, such that VIn=VRef−Vout. In a settled system this error will reach a minimum error, called offset. Within an ideal system of very high gain this offset is zero. The pre-amplifier drives the Power-Stage of the circuit.

The power stage is the last stage of the amplifying system. It is connected to the driving load and consumes the main amount of operating power within the amplifying stages. The circuit architecture has to be selected carefully in accordance with a given set of operation constraints so as to reduce required power and increase the power efficiency. The pull-up-path circuitry PUp is realised as an amplifying inverter and the pull-down-path circuitry PDn is realised as a variable current sink, implemented in N,max(≥1) equal current units (discussed later). The pull-down current path, PDn, may be manipulated by a proportional/differential (PD) regulation loop, or a proportional/integral/differential (PID) regulation loop, which may be controlled by software.

It may be considered that the pull-down path current is defined by the pull-up current minus the output current, as shown in the equation below.

$$IPDn=IPUp-IOut$$

At low or negative output currents IOut (quadrant IV in FIG. 2) the pull-down current is increasing to carry higher currents. As the pull-down current increases, more current is drawn from the output node which essentially compensates for the negative output current, i.e. the current entering the output node from the load.

The load unit, represented as RL1 and RL2, has DC current paths to ground/low-voltage supply AVS and high-voltage supply AVD. As discussed above, the resistances RL1 and RL2 can change in an uncontrolled manner and independently of each other and of the regulator. Thus the summing output current IOut can have positive and negative values constantly (DC) or dynamically. Negative output currents cause an undesirable increase in output voltage.

The output current level of the power-stage IOut is measured indirectly by measuring the gate-source voltage VGS of the power stage PUp inverter. The measured values may then be sent via a low-pass filter 61 and an ADO 62 to the control unit 63, which periodically calculates the new manipulating variable N[0] to set the new pull-down current IPUp. The low-pass filter 61 removes high frequency components of the analogue signal representative of the output current, which, in this example, is the gate voltage VGS. The ADC 62 transfers the detected voltage value into a digital word in periodic time steps. The ADC 62 will preferably operate with low average current consumption, for example, multi-channel working commonly with other signals or as chopper mode with periodically disabled phases.

This part of the circuitry may be considered as a load current level sense system, comprising: a gate-source voltage measuring sensor; a low-pass filter; an analogue-to-digital converter; and a threshold comparing calculation (software section of the PID control/firmware). The next pull-down path current size may be determined by a periodic calculation proportional regulation element (software section of the PID control/firmware), as discussed in more detail below.

The control unit 63 may preferably employ proportional/integral/differential (PID) control functions, i.e. the control unit may be a PID controller. This is discussed in detail below, with reference to FIG. 5. Finally, the pull-down circuitry comprising the ADC 62 and PID controller 63 operate based on a system oscillator. Complex mixed-signal systems (in which the present circuitry may be deployed) provide available clock signals on die, which may be generated by any off-die or on-die oscillator and can be used for the analogue-to-digital conversion and periodic processing of the PID controller.

The detailed embodiment shown in FIG. 4 can be seen to consist of a power stage with a variable pull-down current (PDn) and employ a measurement method with an additional proportional-differential feedback regulation loop to achieve minimum required cross currents (currents flowing from AVD to AVS through the transistor 51 and the variable current sink 64), which cross currents can cause a reduction in the power efficiency of regulators to approximately, for example, 10 to 30%. The output current measurement method detects the DC operation point of the regulator and embodiments of the present invention measure in particular the gate-source voltage of the pull-up transistor 51 (by measuring its gate voltage).

The current on the pull-down path is essentially made to be variable, configurable or switchable by the pull-down-path circuitry in order to increase the power efficiency of the regulator and account for variances in the output current. A closed-loop proportional and differential (PD) regulation of the variable pull-down path current may be implemented by the pull-down control circuitry and may be software controlled. The elements of the pull-down control circuitry shown in FIG. 4, namely a voltage sensing element S, low-pass filter unit 61 and ADC 62, are used for the closed-loop regulation. The regulation of the pull-down current may also be performed in N,max discrete steps, where N[0] is a manipulating variable which may be periodically changed. The path may alternatively be split into N,max logarithmic scaled sections.

When the circuitry is initially powered, the pull-down current is set to a maximum until the output voltage regulation is settled. That is, a maximum current is set on the pull-down path so as to avoid a high output voltage spike on start-up. The pull-down current may then be reduced as the voltage regulation is established and the load connected to the regulator is determined.

Figure 5:
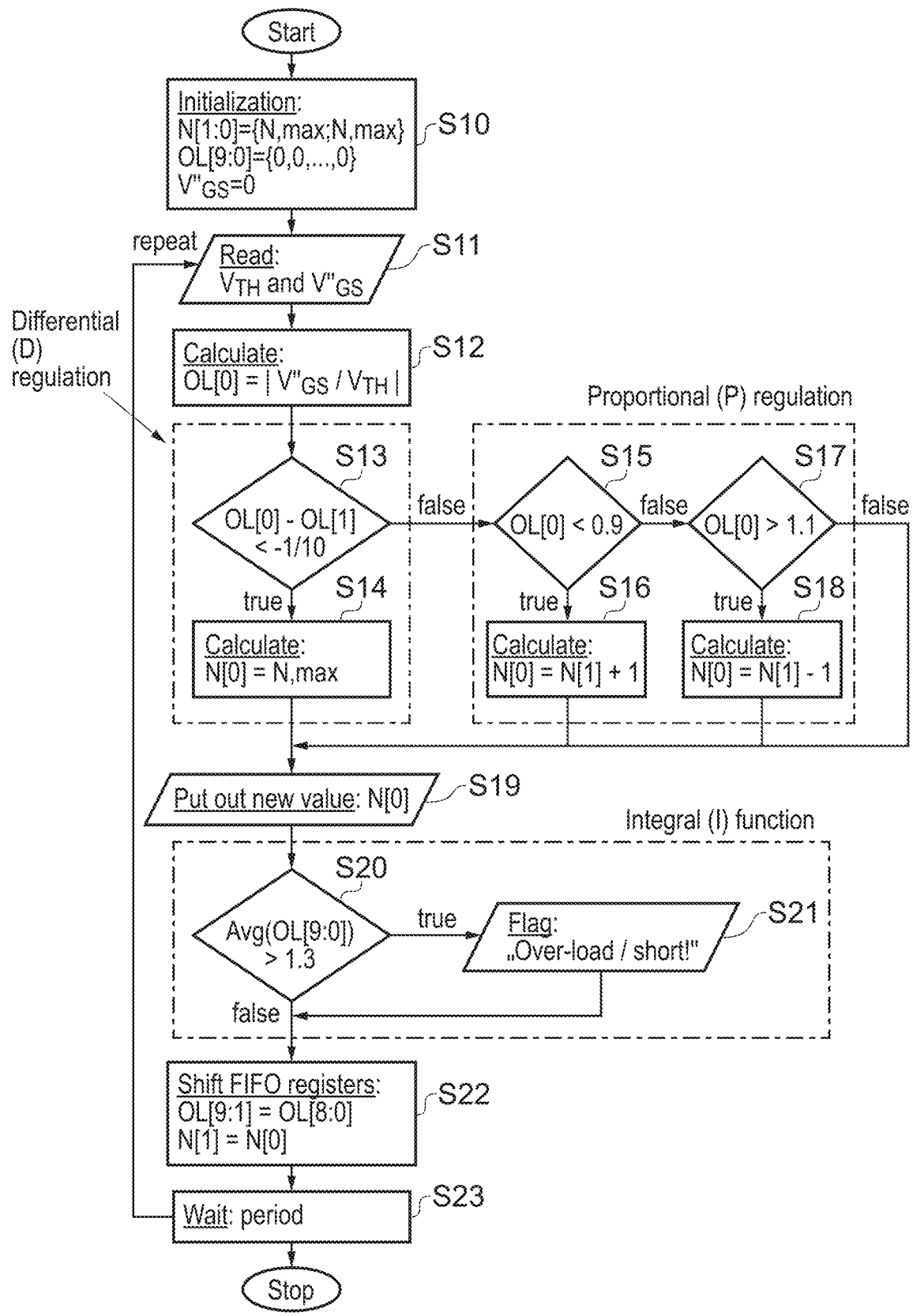
FIG. 5 is a flowchart representing pull-down current control according to a detailed embodiment of an aspect of the invention.

FIG. 5 is a flowchart of pull-down current control according to a detailed embodiment of an aspect of the invention. In the example embodiment of FIG. 5, the pull-down control circuitry, which controls the pull-down current, comprises a proportional, integral and derivative (PID) controller. The proportional/integral/differential control function is (as an example) provided as part of the firmware and closes the pull-down path current regulation loop. The flowchart of FIG. 5 may be considered as a functional diagram of this software part, which is executed periodically (e.g. based on a clock signal).

When a PID controller is implemented (e.g. as a processor executing a computer program), different types of control may be used depending on the changes in the output current. Proportional regulation may be used for slow load current changes and differential regulation for fast changing (reducing) load currents to prevent unstable open load scenarios. An integral function may be used as a slow working watchdog to flag over-load or short circuit conditions (at the output node).

In other words, a periodic calculation differential regulation element (software section of the PID control/firmware) may be used to detect fast load current level changes and prevent temporary open load scenarios with instability risks. This differential element can be implemented by comparing: singular past period only; multiple past periods which can be averaged with same weight; and/or multiple past periods averaged with different weights (e.g. last period has the highest weight). Furthermore, a periodic calculation integral element (software section of the PID control/firmware) may be used to detect high load current levels in order to prevent overload/short circuit conditions which may incur life time reduction. This output may be a digital flag which can be used to change system parameters by optionally reducing load currents, as discussed below.

Start-up of the circuitry and initialisation of the controller is shown at step S10 of FIG. 5.

An array N[1:0], with two values N[0] (the present value) and N[1] (the previous value), is initialised with both values being N,max. At this stage the pull-up current should be set at its maximum, as discussed above, and so the variable will be set at the maximum value, i.e. initializing: N[0]=N,max, until the regulation has settled. The present or current value N[0] controls the variable current sink 64 as indicated in FIG. 4, so that if is value is high the pull down current is high. An output level array OL[9:0], with ten values OL[0] (the present value) to OL[9] (the value 10 sample times or measurement periods in the past), is initialised with all values being 0. An initial value of V"GS (the digital value output from the ADC 62) is also set to 0.

At step S11, the values of the threshold voltage $V_{TH}$ and gate-source voltage $V''_{GS}$ are read. $V_{TH}$ is a corner and temperature dependent threshold constant, $V_{TH}$, which may, for example, either be read from a lookup table or even directly measured. $V''_{GS}$ is the filtered and converted measurement taken from the gate of the transistor (as shown in FIG. 4) and is read from the ADC 62. From these values a current output level OL[0] is calculated in step S12. The current output level is calculated using the following equation:

$$OL[0]=|V''_{GS}/V_{TH}|$$

The current output level OL[0] is then compared with the previous value OL[1] (which initially has value 0 from step S10) at step S13. If the difference between OL[0] and OL[1] (i.e. OL[0]−OL[1]) is negative then $V_{GS}$ is falling and the PMOS transistor is closing (the current flowing through it is reducing). If the difference between OL[0] and OL[1] is significantly negative, here defined as less than (or a bigger negative number than)−1/10 (true at step S13), then differential regulation is used and the current value N[0] is set to N,max at step S14 (it is of course initially at this value, but in future iterations it might not be). That is, the current output level is determined to be rapidly falling to a lower value within a single measurement period, and so the controller output is set to N,max so that the pull-down current is maximum (differential regulation).

Variants of differential regulation (not shown in FIG. 5) may use weighted or unweighted multiple past periods for comparison.

If OL[0]−OL[1] is not less than −1/10 (false at step S13), then proportional regulation is implemented.

At step S15, it is determined whether OL[0] is less than 0.9. If so (true at step S15) N[0] is increased (incremented up) by setting it to be one more than the previous value N[1] at step S16, i.e. N[0]=N[1]+1. This is because the gate-source voltage $V''_{GS}$ is below 90% of the threshold voltage $V_{TH}$, OL[0]<0.9, and so the pull-down current needs to rise one step (proportional step-up regulation) to try allow the gate-source voltage $V''_{GS}$ to rise to be within 10% of the threshold voltage $V_{TH}$. If OL[0] is not less than 0.9 (false at step S16), then the flow proceeds to step S17.

At step S17, it is determined whether OL[0] is greater than 1.1. If so (true at step S17), then N[0] is decreased (incremented up) down by subtracting one from N[1] at step S18, i.e. N[0]=N[1]−1. This is because the gate-source voltage $V''_{GS}$ is above 110% of the threshold voltage $V_{TH}$, OL[0]>1.1, and so the pull-down current needs to be reduced one step (proportional step-down regulation) to try allow the gate-source voltage $V''_{GS}$ to fall to be within 10% of the threshold voltage $V_{TH}$. After N[0] has been updated at step S16 or step S18, or if OL[0] is not greater than 1.1 (false at step S17), i.e. if OL[0] is within 10% of 1, the flow proceeds to step S19.

At step S19 the new current value N[0] is output by the controller to the pull-down control circuitry (variable current sink 64) to control or alter the pull-down current.

At step S20 it is determined whether the average of the values in the array OL (i.e. of output levels over a period of time) is greater than 1.3. If so (true at S20), a flag indicating that the regulator circuitry has likely been over loaded or short circuited is output at step S21 using the integral function of the controller. Step S20 therefore effectively determines whether the load current output level is averagely very high for several measurement periods, Avg(OL[9:0]>1.3. If so, a very high load current level scenario is detected which is then flagged as "Overload/short!" at step S21. This flag can be used to reduce the load current, for example, to reduce the frequency and/or data rate of data converter systems, to limit critical life time reductions or device degradation in the power stage or power wiring. It is therefore possible to implement additional overload flagging without significant additional costs so as to prevent product damage and life-time shortages.

At step S22, the first-in, first-out (FIFO) registers which hold the array values are shifted so that each value is shifted to become the previous one. For example, the previous value N[1] is set to the value of the current value N[0]. The process then waits for a predetermined period at step S23 before repeating from step S11 with newly acquired measurements.

The period between repetitions may be determined, for example, by one or more of: the software application, the value of the output current and thus the necessity to update the control, the availability of the control circuitry to the regulator, the power consumption of the circuitry, changes in the load, etc. If the output voltage is stable then the pull-down current may be held at a suitable level and the pull-down control circuitry may be switched off or switched to a low-power mode. $V_{GS}$ may then periodically be monitored to determine if there are uncontrolled instabilities for more than a periodic cycle and, if there are, then the dynamic control may be reactivated to correct the output. The aim is to avoid ripple at the output for over-voltage and/or life-time degradation and performance issues at the load. That is, the system detects instability and starts corrective measures as discussed before the situation becomes risky and the output voltage starts ringing.

Indeed, a faster hardware detection circuit element may be added to detect fast falling supply load changes (e.g. a Schmitt trigger at S in FIG. 4 or a disable/power-down call of any load/external power-down signal). Such hardware detection may work in parallel to the FIG. 5 S13 output signal (e.g. with an interrupt signal, hard-wired with logical OR with the output of S13 to the PDn unit in FIG. 4 to activate e.g. maximum pull-down current), so the hardware regulation can act much faster than a potentially slower periodic timing of the operation of FIG. 5, and even if the clock signal (clocking elements 62 and 63 in FIG. 4) is missing or software (carrying out the method of FIG. 5) fails.

From the above discussion it can be seen that voltage regulator circuitry according to embodiments of the present invention may have an extended operating output current range and/or may avoid product damage due to high output voltages in an efficient and sophisticated way. For example, the FIG. 5 control will serve to allow negative output currents whilst also reducing as far as possible or minimizing the pull down current and thus the cross current (which represents wasted power). Embodiments of the present invention may be applied to any analogue or digital circuit which requires high DC output current levels and a varying DC output current.

It will be appreciated that the circuitry disclosed herein could be described as a regulator. Circuitry of the present invention may be implemented as integrated circuitry, for example on an IC chip such as flip chip. The present invention extends to integrated circuitry and IC chips as mentioned above, circuit boards comprising such IC chips, and communication networks (for example, internet fiber-optic networks and wireless networks) and network equipment of such networks, comprising such circuit boards.

Figure 6:
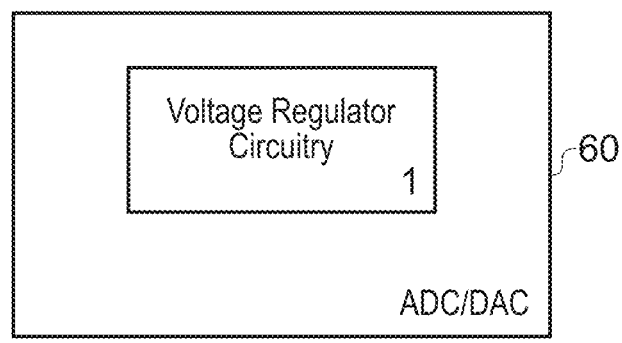
FIG. 6 is a block diagram of a system-on-chip integrated circuit comprising voltage regulator circuitry according to an embodiment of an aspect of the invention.

FIG. 6 is a block diagram of an analogue-to-digital converter (ADC) or digital-to-analogue converter (DAC) circuit 60 comprising voltage regulator circuitry 1 according to an embodiment of an aspect of the invention. The voltage regulator circuitry 1 may be provided as part of an ADC or DAC as shown in FIG. 6, or may be provided as part of any integrated circuit, system-on-chip, amplifier, analogue or digital circuit (e.g. PLL) which requires high DC output current levels and/or a large range of DC output current, or circuitry which requires a reference and/or regulated voltage. For example, the use of the circuitry disclosed herein may reduce costs and complexity for system designers incorporating it into larger circuitry. DAC/ADC and PLL (oscillator) performance may strongly depend on low supply ripple and high PSRR requirements, which can be done with 2nd order regulation e.g. using LDOs (Low Drop-Out Regulators) configured in accordance with the circuitry disclosed herein.

In general, the transistors discussed herein may be implemented as FETs or MOSFETs (as shown) or as BJTs. The present disclosure will be understood accordingly.

In any of the above aspects, the various features may be implemented in hardware, or as software modules running on one or more processors as appropriate. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The present invention may be embodied in many different ways in the light of the above disclosure, within the spirit and scope of the appended claims.

The invention claimed is:

1. Voltage regulator circuitry, comprising:
    a pull-up path connected between a high-voltage supply and an output node for supplying a pull-up current from the high-voltage supply to the output node;
    a pull-down path connected between the output node and a low-voltage supply for drawing a pull-down current from the output node to the low-voltage supply;
    a controller comprising pull-up control circuitry operable to control the pull-up current and pull-down control circuitry operable to control the pull-down current, so as to regulate an output voltage signal provided at the output node at a target voltage level even when an output current drawn, by a load, from the output node along an output current path varies over a range of positive and negative values; and
    a failsafe hardware detection circuit configured to perform one or more of: detecting a critical falling output current, and receiving a critical load-change signal from the load, and, if a critical falling output current is detected or the critical load-change signal is received, to control the pull-down current independently of at least part of said pull-down control circuitry to reduce or limit a risk of the voltage level of the output voltage signal exceeding an upper-limit value,
    wherein the pull-down control circuitry is operable to:
        obtain measures of the pull-up current; and
        control the pull-down current based on the measures using proportional, derivative and integral control.

2. The voltage regulator circuitry of claim 1, wherein the pull-up control circuitry is operable to control the pull-up current based on the output voltage signal.

3. The voltage regulator circuitry of claim 1, wherein the pull-up control circuitry comprises pull-up-path circuitry in the pull-up path, and is operable to control the pull-up-path circuitry so as to control the pull-up current.

4. The voltage regulator circuitry of claim 3, wherein the pull-up control circuitry comprises a differential amplifier operable to compare a reference voltage and a voltage signal indicative of the output voltage signal and to control the pull-up-path circuitry to regulate the output voltage signal at the target voltage level based on the comparison.

5. The voltage regulator circuitry of claim 1, wherein the pull-down control circuitry comprises pull-down-path circuitry in the pull-down path, and is operable to control the pull-down-path circuitry so as to control the pull-down current.

6. The voltage regulator circuitry of claim 1, wherein the pull-down control circuitry is operable to:
    monitor the operation of the pull-up control circuitry and determine whether the pull-down current can be reduced without the operation of the pull-up control circuitry departing from a given range of operation; and
    reduce the pull-down current if it is determined that the pull-down current can be reduced without the operation of the pull-up control circuitry departing from the given range of operation.

7. The voltage regulator circuitry of claim 6, wherein the pull-down control circuitry is operable to minimize the pull-down current to an extent possible without the operation of the pull-up control circuitry departing from the given range of operation.

8. The voltage regulator circuitry of claim 1, wherein the pull-down control circuitry is operable to control the pull-down current so that it has a maximum value on start-up of the voltage regulator circuitry so as to reduce or limit a risk of the voltage level of the output voltage signal exceeding an upper-limit value.

9. The voltage regulator circuitry of claim 1, wherein the pull-down control circuitry is operable to obtain the measures in each of a series of respective discrete measurement cycles, and to control the pull-down current in each measurement cycle.

10. The voltage regulator circuitry of claim 9, wherein the pull-down control circuitry is operable to control the pull-down current in each measurement cycle based on a plurality of said measures including a present measure and at least one previous measure.

11. The voltage regulator circuitry of claim 1, wherein the pull-down control circuitry comprises a processor operable, based on a computer program, to control the pull-down current based on the measures of the pull-up current.

12. The voltage regulator circuitry of claim 1, wherein the pull-down control circuitry is connected to obtain measures of a gate or base voltage of a pull-up transistor connected along the pull-up path as the measures of the pull-up current.

13. The voltage regulator circuitry of claim 1, wherein the pull-down control circuitry is operable to low-pass filter the measures of the pull-up current to obtain low-pass-filtered measures, and to control the pull-down current based on the low-pass-filtered measures.

14. The voltage regulator circuitry of claim 13, wherein the pull-down control circuitry comprises an analogue-to-digital converter operable to convert the measures of the pull-up current or the low-pass-filtered measures into digital-value measures, and to control the pull-down current based on the digital-value measures.

15. The voltage regulator circuitry of claim 1, wherein:
the pull-down control circuitry is operable to control the pull-down current based on the measures of the pull-up current using said integral control, and is operable to output a warning flag if the control indicates that the operation has entered a warning state for a given amount of time; or
the controller is operable to switch off, reduce power to or release control of at least part of the pull-down control circuitry when the pull-up current is in a predetermined range.

16. The voltage regulator circuitry of claim 3, wherein the pull-up-path circuitry comprises a pull-up transistor connected along the pull-up path.

17. The voltage regulator circuitry of claim 5, wherein the pull-down-path circuitry comprises one or more of: a controllable current sink, a controllable resistance, a controllable current mirror, and a controllable transistor connected along the pull-down path.

18. The voltage regulator circuitry of claim 9, wherein the measurement cycles occur regularly and are synchronised with a clock signal.

19. The voltage regulator circuitry of claim 10, wherein the plurality of measures comprises the measures of consecutive measurement cycles.

* * * * *